(12) United States Patent
Rayis

(10) Patent No.: US 10,893,778 B1
(45) Date of Patent: *Jan. 19, 2021

(54) SERVING SPOON WITH DEPRESSION FORMING FEATURE

(71) Applicant: Paul Rayis, Scottsdale, AZ (US)

(72) Inventor: Paul Rayis, Scottsdale, AZ (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/364,136

(22) Filed: Mar. 25, 2019

Related U.S. Application Data

(63) Continuation of application No. 15/223,420, filed on Jul. 29, 2016, now Pat. No. 10,238,238.

(60) Provisional application No. 62/285,240, filed on Oct. 23, 2015.

(51) Int. Cl.
- *A47J 43/20* (2006.01)
- *A47J 43/28* (2006.01)
- *A23G 9/28* (2006.01)

(52) U.S. Cl.
CPC ............ *A47J 43/282* (2013.01); *A47J 43/20* (2013.01); *A47J 43/281* (2013.01)

(58) Field of Classification Search
CPC ........ A47J 43/282; A47J 43/20; A47J 43/281; A47J 9/007
USPC .......................................................... D7/691
See application file for complete search history.

(56) References Cited

U.S. PATENT DOCUMENTS

| | | | | |
|---|---|---|---|---|
| 1,012,944 A * | 12/1911 | Walker et al. | ........ | A47J 43/282 425/284 |
| 1,857,685 A * | 5/1932 | Friedman | ............. | A47J 43/282 425/187 |
| 2,129,753 A * | 9/1938 | Wilhoit | ................. | A47J 43/282 425/284 |
| 2,260,689 A * | 10/1941 | Miller | ................... | A47J 43/282 425/187 |
| 2,631,551 A * | 3/1953 | Lawrence | ............. | A47J 43/282 425/187 |
| 3,322,075 A * | 5/1967 | Cronheim | ............. | A47J 43/282 425/279 |
| 3,358,619 A * | 12/1967 | Pareira | .................. | A47J 43/282 425/276 |
| D594,287 S * | 6/2009 | Ablo | ............................. | D7/672 |
| 2004/0134079 A1* | 7/2004 | Lion | ..................... | A47J 43/282 30/324 |
| 2005/0081385 A1* | 4/2005 | Ho | ........................ | A47J 43/281 30/123 |
| 2014/0130359 A1* | 5/2014 | Gonterman | ............. | A47J 43/28 30/324 |

FOREIGN PATENT DOCUMENTS

JP 2008237678 A * 10/2008 ............ A47J 43/281

* cited by examiner

*Primary Examiner* — Daniel J Colilla
(74) *Attorney, Agent, or Firm* — Invention To Patent Services; Alex Hobson

(57) ABSTRACT

A serving spoon has a spoon portion with a depression portion that forms a depression in a serving of malleable food product, thereby allowing some other food product to be retained within the depression. The serving spoon includes a spoon portion and a handle portion. The spoon portion has a concave body and a depression portion configured within the concave body, wherein the depression portion extends up from the bottom of the concave body. The depression portion forms a depression, in a malleable food product. The spoon portion may be detachable from the handle portion.

15 Claims, 8 Drawing Sheets

SERVING SPOON WITH DEPRESSION FORMING FEATURE

CROSS REFERENCE TO RELATED APPLICATIONS

This application claims the benefit of U.S. patent application Ser. No. 15/223,420, filed on Jul. 29, 2016 and now issued as U.S. Pat. No. 10,238,238, on Mar. 26, 2019, which claims the benefit of U.S. provisional patent application No. 62/285,240, filed on Oct. 23, 2015; the entirety of which is incorporated by reference herein.

BACKGROUND OF THE INVENTION

Field of the Invention

The invention relates to serving spoons, and particularly to serving spoons for malleable food products that often have a topping added thereon.

Background

Serving spoon for malleable food products, such as mashed potatoes, ice cream and the like are usually round and concave in shape and produce a dome shaped servings. Many malleable food products are often enhanced with toppings. For example, many people like butter, or gravy on their mashed potatoes, or hot fudge, whipped cream or sprinkles on their ice cream. A depression is sometimes formed in the served food product for the purposes of holding and retaining these toppings.

There exists a need for a serving spoon that can automatically form a depression in a malleable food product.

SUMMARY OF THE INVENTION

The Invention is directed to a serving spoon that has a spoon portion with a depression portion that forms a depression, in a serving of malleable food product, thereby allowing a fill food product to be retained within the formed depression. For example, the serving spoon of the present invention can be used to serve mashed potatoes and depression will be formed in the serving of mashed potatoes for receiving and retaining gravy, or butter, for example. Likewise, the serving spoon of the present invention may be used to serve ice cream and the depression formed in the ice cream may be used to receive and retain syrup or sprinkles, for example. Any type of malleable food product may be served with a depression formed therein with the serving spoon of the present invention. A malleable food product is a soft and formable food product that takes the shape of the serving spoon.

An exemplary serving spoon comprises a spoon portion and a handle portion. In exemplary serving spoon consists of a spoon portion and a handle may be formed from a single piece of material, such as an injection molded part. In an exemplary embodiment, the spoon portion is detachable from the handle portion, thereby enabling a user to attach different spoon portions to the handle. The spoon portion comprises a concave body defining a volume for retaining a food item and a depression portion configured within the volume of the concave body that forms the depression in the malleable food product. The spoon portion may have any number of geometries or designs including scallops or ridges in the concave body or depression portion to produce a serving of malleable food product that is more decorative.

The spoon portion comprises a top having a top edge; a bottom; a front surface; a back surface; a height from the bottom to the top; a concave body defining a volume for retaining a food item; and a depression portion configured within the volume of the concave body and extending up toward said top. The spoon portion or concave body of the spoon portion may be dome shaped having generally circular cross-section at the top edge that reduces down to a smaller circular cross-section at the bottom of the concave body portion. The concave portion may be bow shaped, to describe it another way, wherein the concave body forms a bowl having a larger top edge diameter than a bottom diameter. The concave body of the spoon portion may have a geometric shape, such as a star, a square, a pentagon, or octagon, or any other polygon shape, or an irregular shape. The spoon portion may comprise scallops or ridges that form a decorative shape in the malleable food product. The scallops and ridges may extend away from the curvature of the concave body portion and may extend from the bottom of the concave body to the top edge.

The spoon portion may be configured to provide a serving of malleable food product that is about 50 $cm^3$ in volume or more, about 100 $cm^3$ in volume or more, about 150 $cm^3$ in volume or more, about 300 $cm^3$ in volume or more, no more than about 400 $cm^3$, no larger than about 500 $cm^3$, no larger than about 400 $cm^3$ and any range between and including the volumes provided. An exemplary serving spoon of the present invention is configured for hand operation and for providing a single serving of food product. The spoon portion may have a height, from the bottom to the top edge that is about 1 cm or more, about 2.5 cm or more, about 5 cm or more, about 8 cm or more, no more than about 10 cm and any range between and including the heights provided.

The depression portion is configured within the concave body portion of the spoon portion and extends up from the bottom of the concave body. The depression portion may also be dome shaped, wherein the diameter of the depression portion is larger where it couples to the concave body than at the top of the depression portion. The depression portion may be integral with the concave body of the spoon portion, wherein they are formed from a single piece of material or are fixedly attached, whereby separation would damage the spoon portion. In an alternative embodiment, the depression portion is detachably attachable to the concave body. The surface of the depression portion may be smooth and curved, such as s dome shape. The depression portion may be any suitable geometric shape, such as a star, a square, a pentagon, or octagon, or any other polygon shape, or an irregular shape. In an exemplary embodiment the depression portion may be truncated in dimension from a bottom to the top, wherein a maximum cross-height dimension, dimension that is perpendicular to the height, is reduced from the bottom to the top of the depression portion. A truncated shape depression portion may aid in the release of the malleable food product from the exemplary serving spoon. The height of the depression portion may be a portion of the height of the concave body portion, such as at least about 10% or more of the height of the concave body portion, at least about 30% or more of the height of the concave body portion, at least about 50% or more of the height of the concave body portion, no more than 75% of the height of the concave body portion, no more than 50% of the height of the concave body portion and any range between and including the height percentages provided. The depression portion may extend substantially to the top of the concave body portion. The depression portion may form a depression in the malleable food product that has a volume of about 5 $cm^3$ in volume or more, about 10 cm$^3$ in volume or more, about 50 cm$^3$ in volume or more, about 100 cm$^3$ in volume or more, about 200 cm$^3$ in volume or more, no more than about 200 cm$^3$, no larger than about 200 cm$^3$, no larger than about 100 cm$^3$ and any range between and including the volumes provided. Put another way, the ratio of volume of the depression formed in the malleable food product, or the volume of the depression portion, to the volume of malleable food product, or the volume of the concave body portion may be about 0.05 or more, about 0.1 or more, about 0.25, about 0.4 or more, or no more than about 0.5 and any range between and including the ratios provided. For example, if the serving spoon deposits 100 cm$^3$ of mashed potatoes and the depression can hold 10 cm$^3$ of gravy, the ratio of volume of the depression portion to the volume of the served food product, or the concave body is 0.1.

The spoon portion may be made from any suitable material, but preferably a durable material that can withstand numerous wash cycles, such as metal, plastic, ceramic, rubber and the like. Preferably, the spoon portion is made from a material that will allow easy release of the malleable food product and may comprise a release coating, such as silicone, fluoropolymer and the like. An exemplary spoon portion may comprise one or more vent holes to allow malleable food product to release from the concave body easily, without forming a vacuum within the concave body. Some malleable food products may be more susceptible to sticking to the serving spoon than others, such as gelatin, for example. A vent hole may be formed proximal to the bottom of the concave body portion or in the depression portion. In an exemplary embodiment, a plurality of holes are configured in the concave body portion around the perimeter of the depression portion. In another exemplary embodiment, one or more vent holes are configured in the depression portion.

The serving spoon of the present invention comprises a handle portion having an attached end that is attached to the spoon portion and an extended end. The handle has a length from the attached end to the extended end. The handle may be configured specifically for serving a malleable food product wherein the handle extends from the spoon portion at a handle angle that is at least 15 degrees. The top of the concave body forms a plane and the handle angle is the angle from this plane, wherein the extended end of the handle is below the top concave body plane or extends down, as described herein. This recessed angle of the handle provides room for a user's hand when serving a food product from the serving spoon, wherein the top of the concave body is resting on the surface of plate, for example.

In an exemplary embodiment, the serving spoon is made from a single piece of material, such as by molding wherein the spoon portion and handle portion are a one-piece unit. In another exemplary embodiment, the spoon portion may detach from the handle portion to allow a user to select the type of spoon portion that they want to use for the food product. For example, for mashed potatoes they may choose a spoon portion having a classic dome shaped concave body, however for ice cream, they may choose a spoon portion with an irregular shape or a spoon portion that is dome shaped but has a star shaped depression portion. The spoon portion may detach from the handle portion through any suitable means, including a fastener, a clip, an interference fit connection and the like.

In an exemplary embodiment the spoon portion, or both the concave body and depression portion are solid and contain no holes or apertures therethrough to allow draining of liquid through the spoon portion. In an exemplary embodiment the depression portion is fixed to the concave body around the base or bottom perimeter of the depression portion, and is not configured to move during use.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
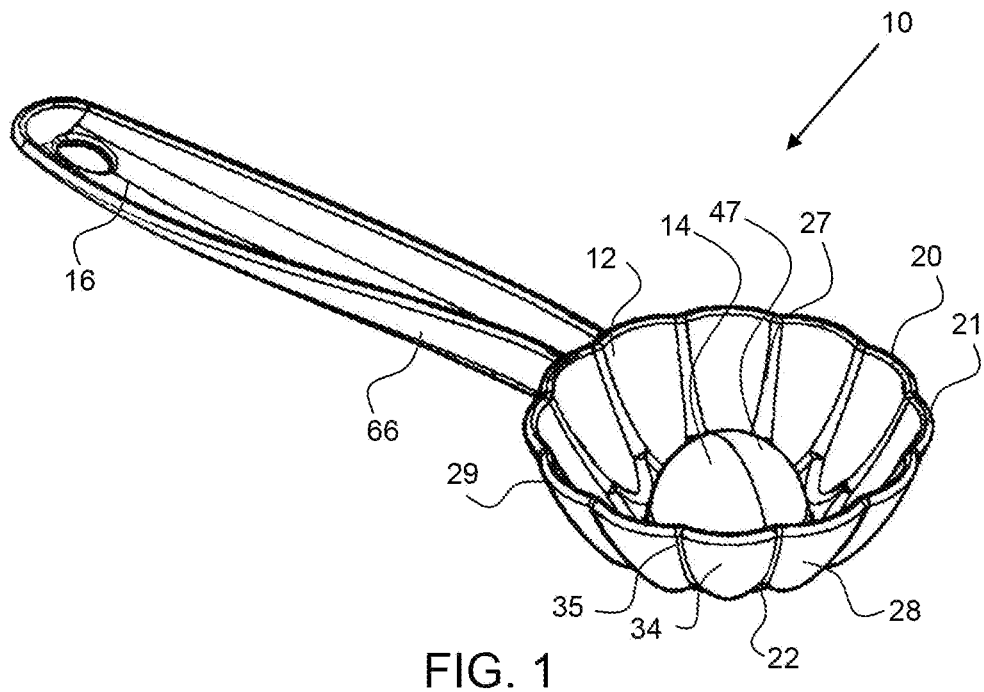
FIG. 1 shows a top perspective view of an exemplary serving spoon.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Figure 2:
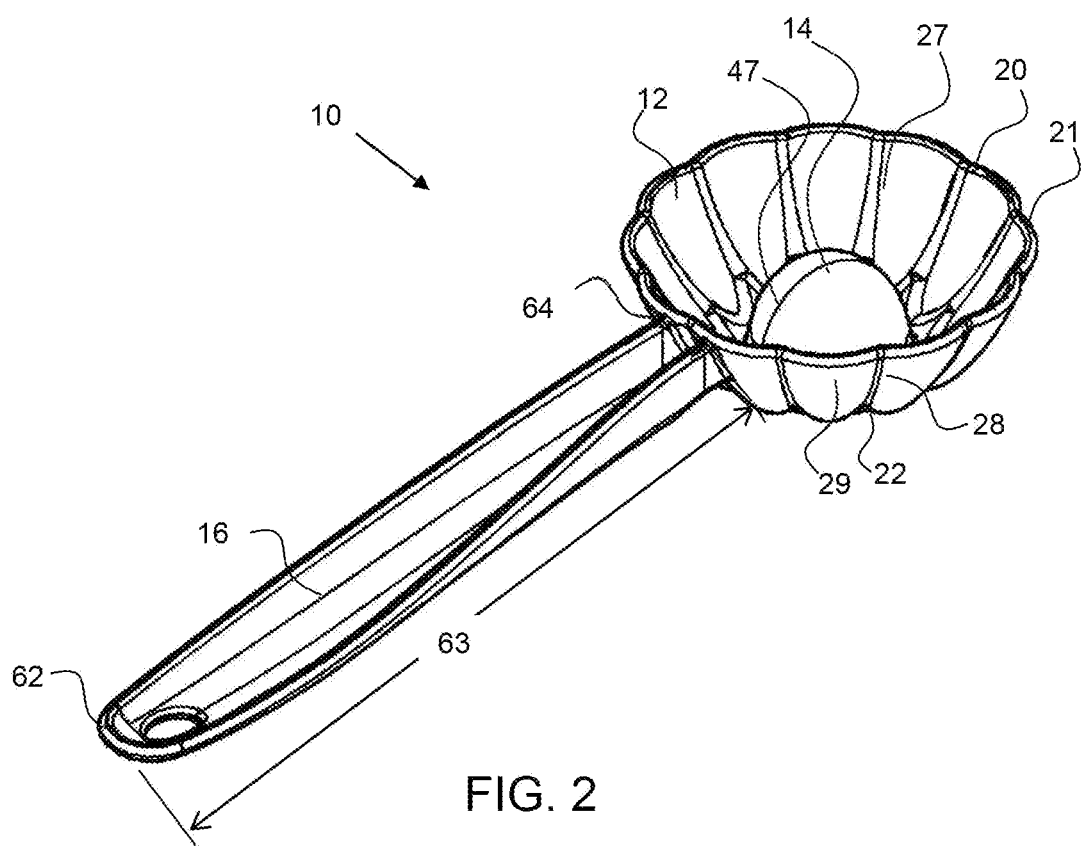
FIG. 2 shows a top perspective view of an exemplary serving spoon.

Referring now to FIGS. 1 and 2, an exemplary serving spoon 10 comprises a handle 16, and a spoon portion 12. The spoon portion 12 has a concave body 29, like a scoop or bowl, that defines a volume for retaining a food item. The concave body 29 of the spoon portion has a substantially circular shaped top 20 or top edge 21, and the walls of the concave body 29 extend down to the bottom of the spoon portion 22. The top edge of the concave body is scalloped or undulating but is still substantially defined as circular shape. The front surface 47 of depression portion 14 is spherical or dome shaped. The depression portion extends up within the concave body 29 at least one-quarter of the height of the spoon portion, as measured from the bottom 22 to the top of the spoon portion 20. The front surface 47 of the depression portion creates a depression in a malleable food product, such as mashed potatoes, when served with the serving spoon, as described herein. The concave body of the spoon portion has an inside surface 27 and an outside surface 28. The serving spoon has a handle portion 16 that is attached to the spoon portion 12. The handle of the serving spoon has a length 63 from the attached end 64 to the extended end 62. The handle comprises struts for strength. The struts are formed of folded portions of the planar handle, wherein the struts are folds that extend up in a direction substantially perpendicular from the connection portion between the struts. The concave body 29 of the spoon portion comprises scallops 34, or adjoining curved portions that extend around the perimeter of the concave body. The scallops create ridges 35 in a malleable food product when it is served using the serving spoon, as described herein.

Figure 3:
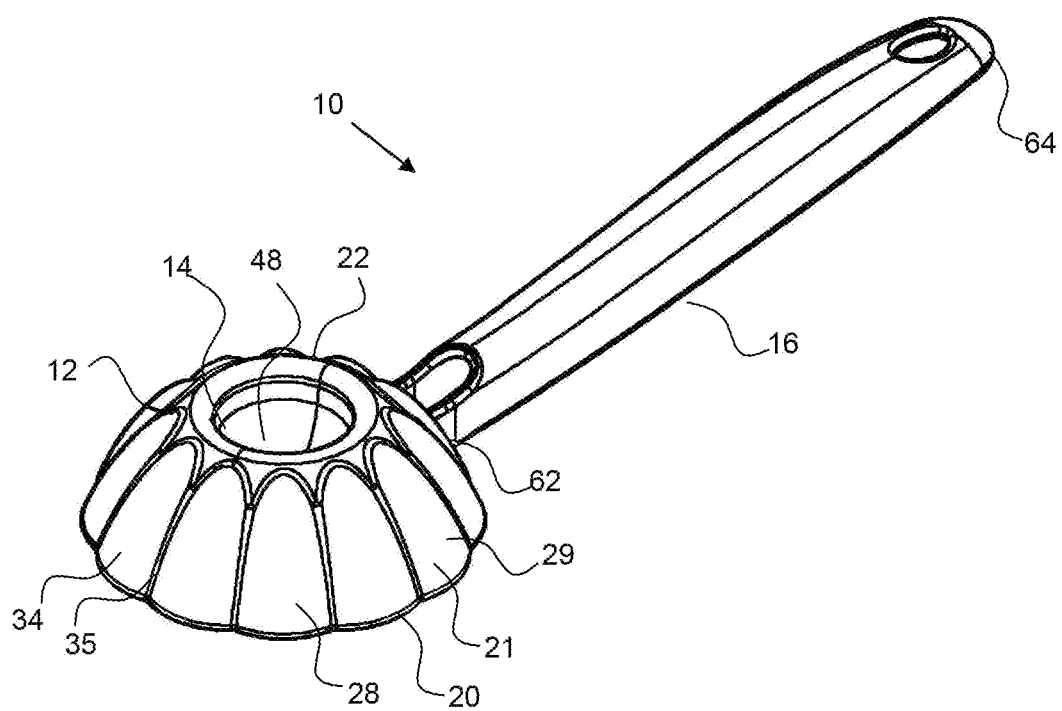
FIG. 3 shows a bottom perspective view of an exemplary serving spoon.
Figure 4:
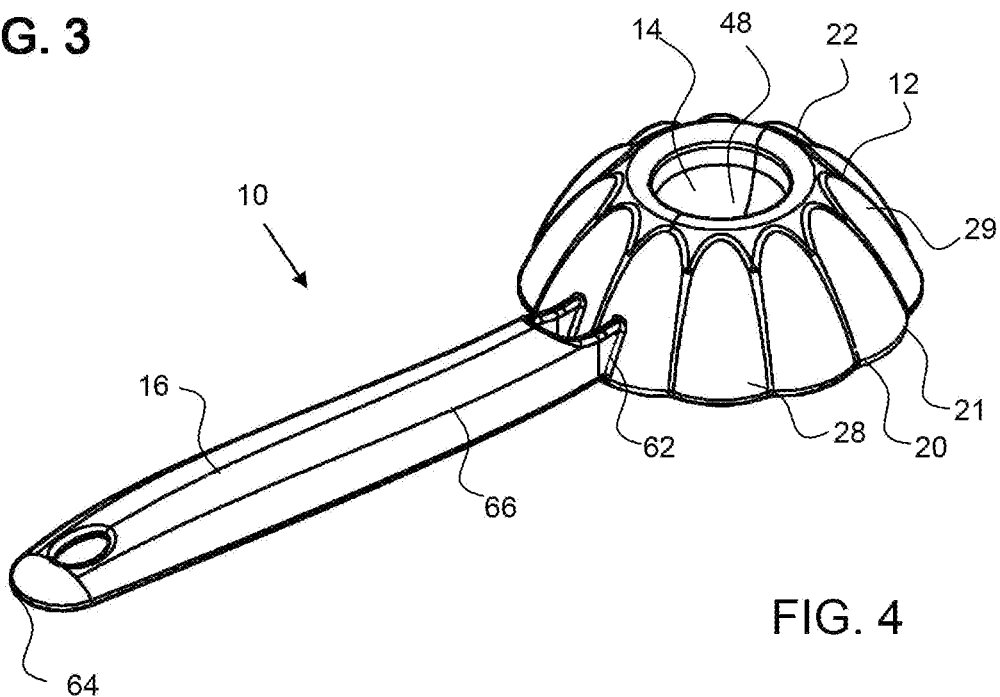
FIG. 4 shows a bottom perspective view of an exemplary serving spoon.

Referring now to FIGS. 3 and 4, the exemplary serving spoon has a depression portion 14 that extends up into the concave body portion from the bottom of the spoon portion 12. The depression portion is dome shaped and is an integral part of the spoon portion, in this embodiment, wherein the concave body portion and depression portion are formed from a single piece of material, such as by injection molding or vacuum forming. The depression portion may be a separate from the concave body portion however and be detachably attachable to the concave body or spoon portion. The depression portion has a back surface 48. The depression portion and spoon portion are both made from a single piece of material that is shaped and forms the concave body portion and the depression portion. The concave body and depression portion are contiguous wherein the inner and outer surfaces of the concave body and the depression portion form a continuous surface. The spoon portion and integral depression portion may be made by injection molding or vacuum forming, for example.

Figure 5:
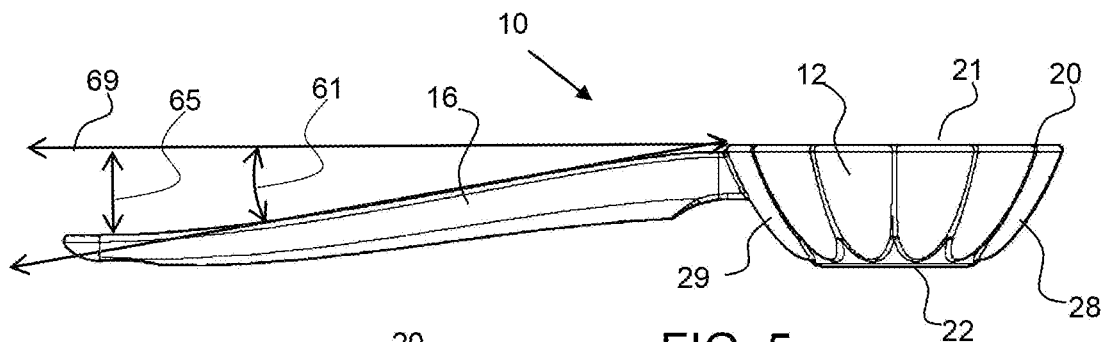
FIG. 5 shows a side view of an exemplary serving spoon.
Figure 6:
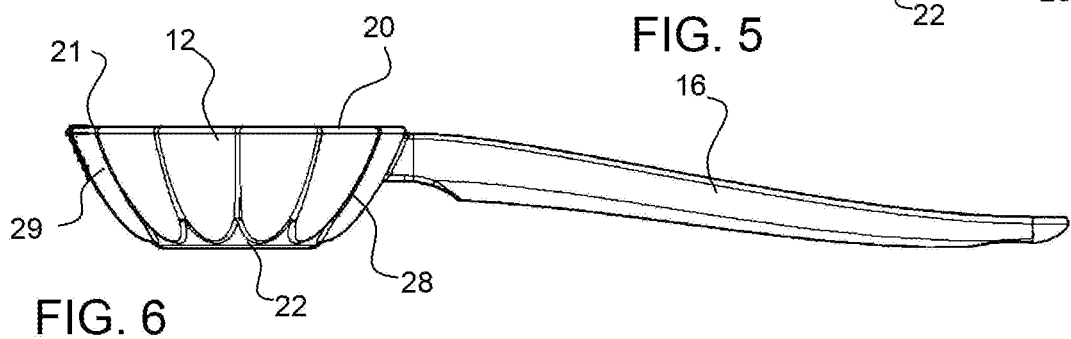
FIG. 6 shows a side view of an exemplary serving spoon.

Referring now to FIGS. 5 and 6, the exemplary serving spoon is substantially uniform from side to side. The handle 16 extends downward from the top 20 of the spoon portion 12, at a handle angle 61, to create an offset distance 65, that allows the serving spoon to be turned upside down to serve contents within the concave body without the handle interfering. The plane 69 formed by the top-edge 21 of the spoon portion is shown.

Figure 7:
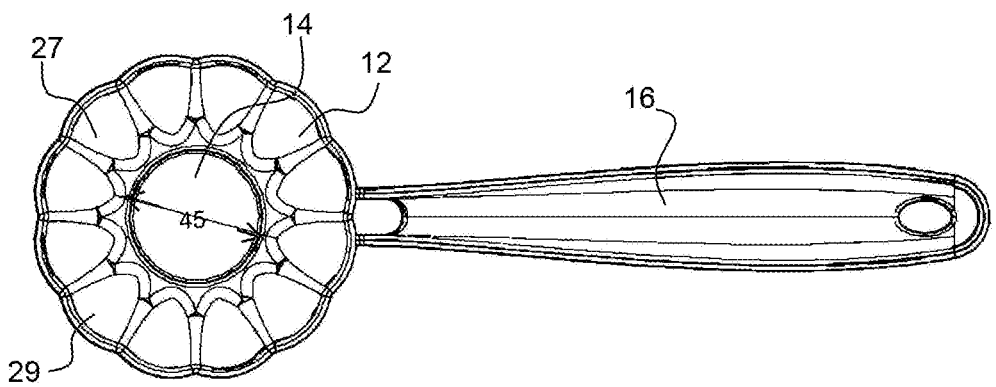
FIG. 7 shows a top view of an exemplary serving spoon.
Figure 8:
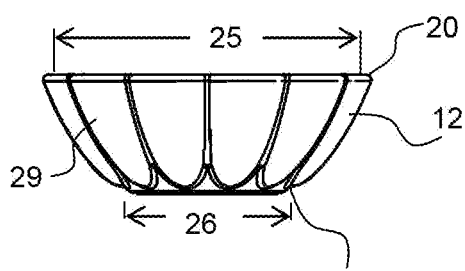
FIG. 8 shows a spoon-end view of an exemplary serving spoon.
Figure 9:
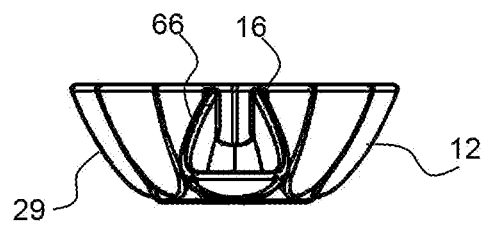
FIG. 9 shows a handle-end view of an exemplary serving spoon.

Referring now to FIGS. 7, 8 and 9, the exemplary serving spoon has a depression portion 14 having a diameter 45 that is established at the base, or largest diameter area of the depression portion. In this exemplary embodiment, the depression portion has a dome shape and therefore the largest diameter of the dome is toward the base end, where the depression dome couples with the concave body 20. The spoon portion or concave body of the spoon portion has a top diameter 25 across the top 20 of the spoon portion 12 and a bottom diameter 26 along the bottom 22. The diameter along the top of the spoon portion is considerably larger than the diameter along the bottom. The diameter of the depression portion 45 is substantially smaller than the diameter 25 of the spoon portion along the top of the spoon portion, as described herein. As shown in FIG. 9, the handle 16 has a strut 66 that is formed from a folded portion of the handle.

Figure 10:
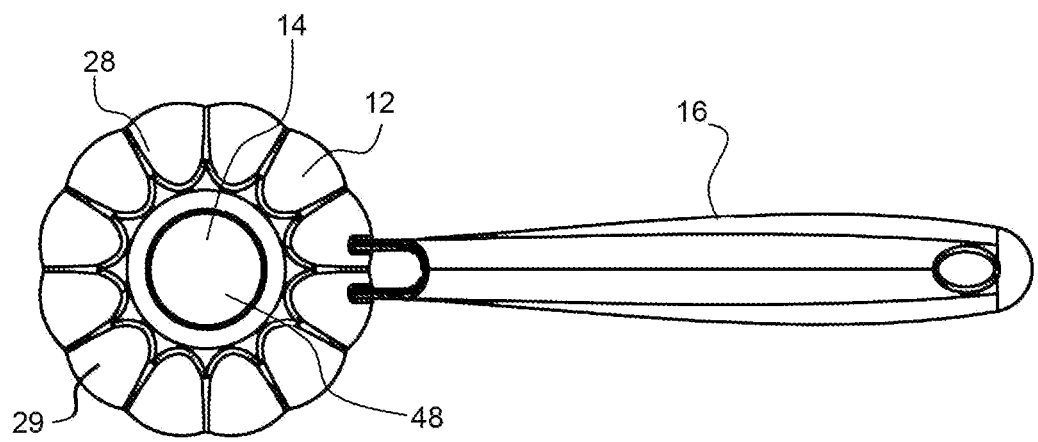
FIG. 10 shows bottom view of an exemplary serving spoon.

As shown in FIG. 10, the outside surface of the spoon portion 28 extends to the back surface 48 of the depression portion 14.

Figure 11:
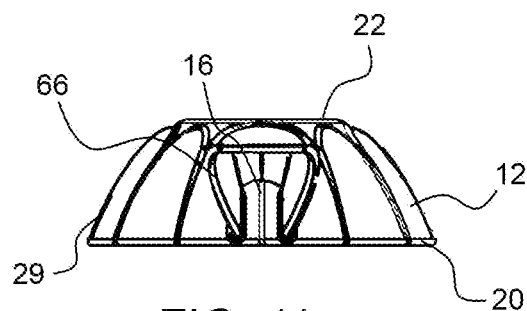
FIG. 11 shows a handle-end view of an exemplary serving spoon.

As shown in FIG. 11, the spoon portion 12 is also dome shaped, wherein the top surface has a larger diameter than the bottom 22, and wherein the surface has a radius of curvature from the top 20 to the bottom 22 of the spoon portion 12.

Figure 12:
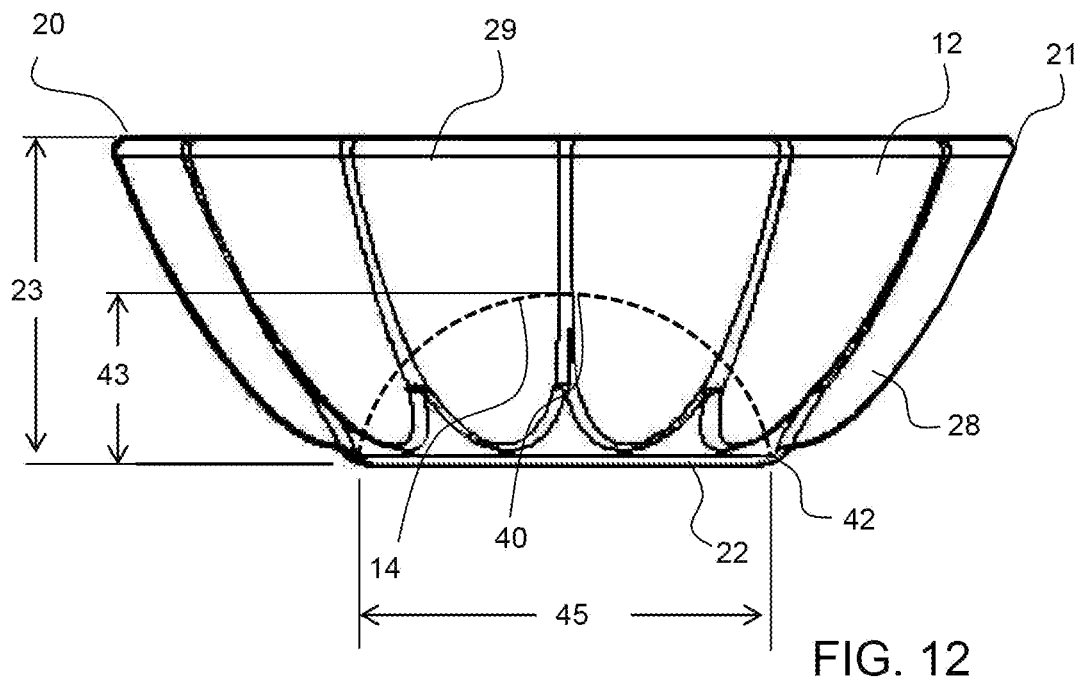
FIG. 12 shows an enlarged view of the spoon portion of an exemplary serving spoon.

As shown in FIG. 12, the exemplary depression portion 14 is dome shaped and extends up from the bottom of the spoon portion 12 into the concave body 29. The top 40 of the dome shaped depression portion is centered within the concave body of the spoon portion. The height of the depression portion 43 is a significant portion of the overall height 23 of the concave body 29 or spoon portion, such as at least one quarter of the overall height 23. The depression portion will form a depression in a serving of malleable food product, thereby allowing some other food product to be retained within the depression. As described herein the exemplary serving spoon of the present invention may be used to serve mashed potatoes and the depression may be filled with butter, sour cream, chives, bacon, and any other suitable toping that people enjoy on mashed potatoes. The diameter 45 of the depression portion 14 along the base of the depression portion, or where it couples with the concave body portion 29, is shown.

Figure 13:
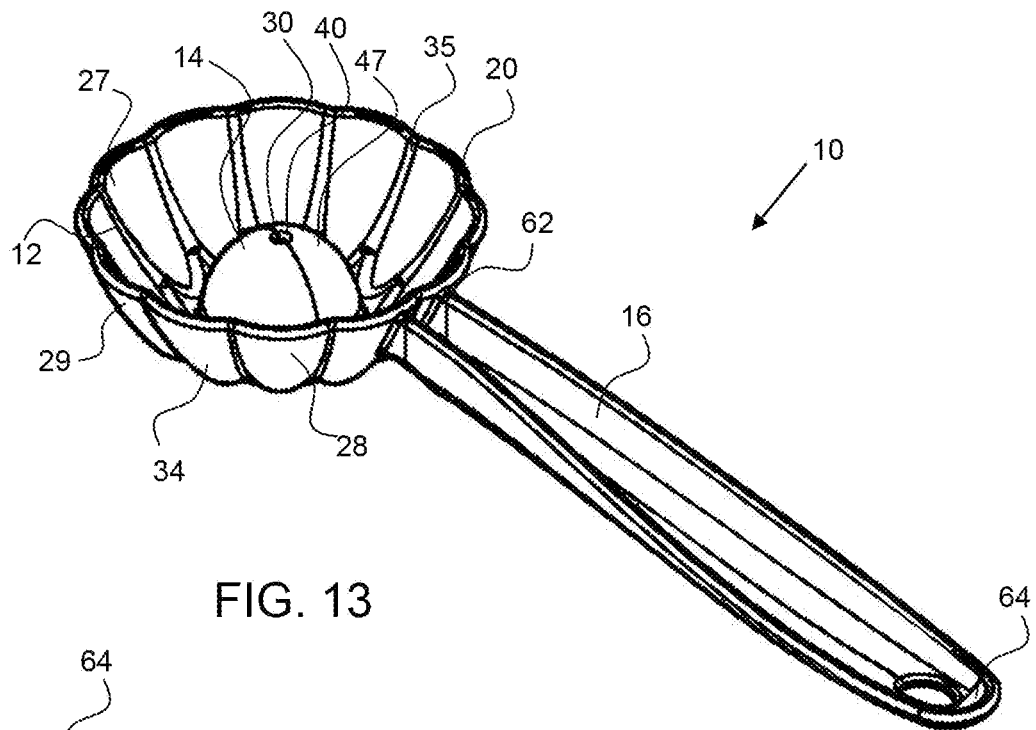
FIG. 13 shows a perspective view of an exemplary serving spoon having a vent hole in the depression dome.

As shown in FIG. 13, the exemplary serving spoon 10 comprises a vent hole 30 in the top 40 of the depression portion 14. The vent hole may enable a malleable food product to more effectively release from the concave body 29 of the spoon portion 12. The vent hole 30 is centrally located at the apex of the dome shaped depression portion.

Figure 14:
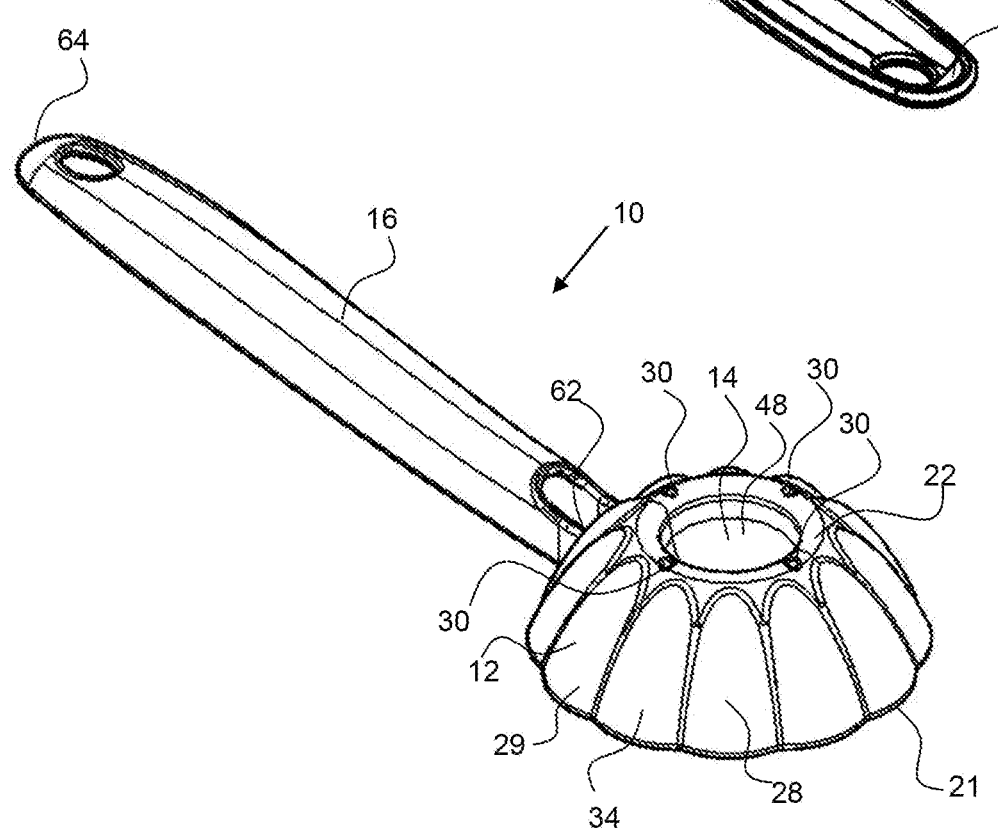
FIG. 14 shows a perspective view of an exemplary serving spoon having four vent holes in the bottom of the spoon portion, around the depression dome.

As shown in FIG. 14, the exemplary serving spoon 10 comprises four vent holes 30 in the spoon portion 12. The vent holes are configured around the perimeter of the base of the depression portion 14, or around the perimeter of the back surface 48 of the depression portion. Again, the vent holes may allow a malleable food product to be released more easily from the spoon portion.

Figure 15:
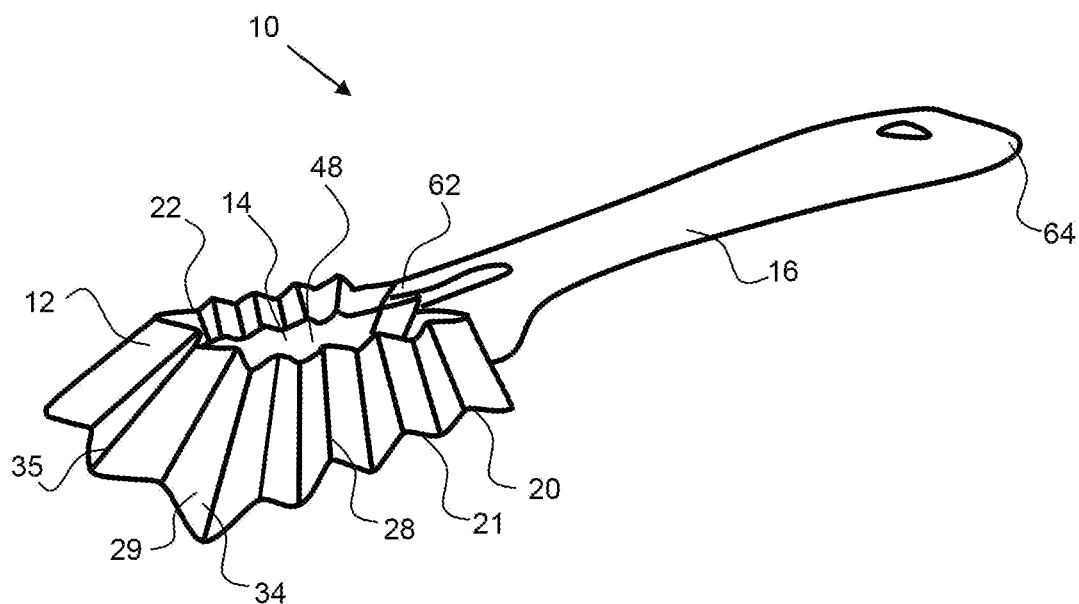
FIG. 15 shows a perspective view of an exemplary serving spoon having a scalloped spoon portion.

As shown in FIG. 15, an exemplary serving spoon 10 comprises a spoon portion 12 that has a concave body 29 having an open area along the top surface 21, or top 20, of the spoon portion that is larger than the bottom 22. The concave body 29 has a plurality of scallops 34 that will form a decorative shape when a malleable food product is served therewith. Ridges will be formed in the malleable food product by the ridges 35 in the concave body 29.

Figure 16:
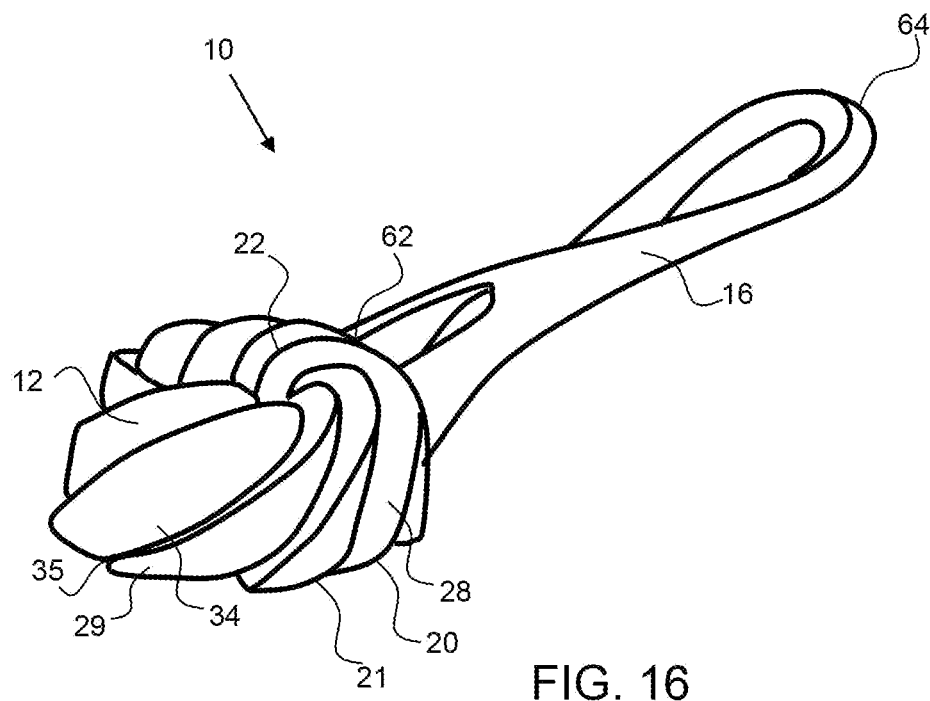
FIG. 16 shows a perspective view of an exemplary serving spoon having a scalloped spoon portion.
Figure 17:
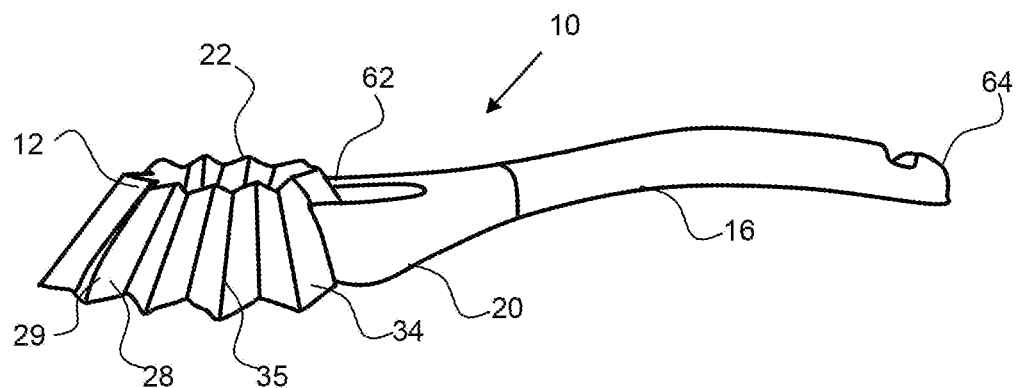
FIG. 17 shows a perspective view of an exemplary serving spoon having a scalloped spoon portion.
Figure 18:
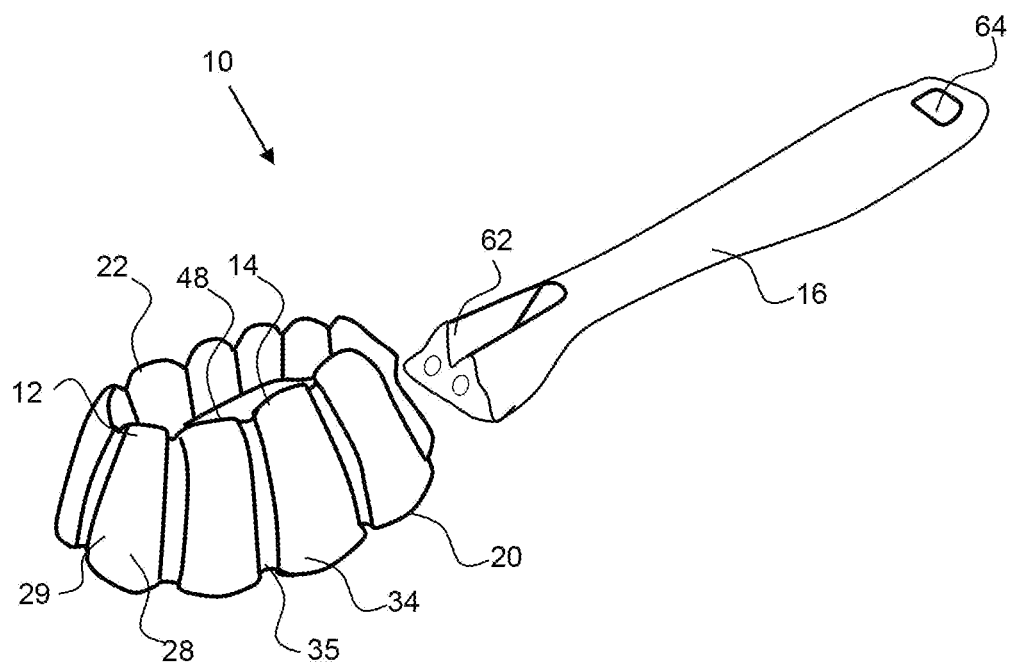
FIG. 18 shows a perspective view of an exemplary serving spoon having a scalloped spoon portion.

Referring to FIGS. 16, 17 and 18, the exemplary serving spoon 10 has a decorative concave body that will form a decorative shape in the malleable food product served therewith. As shown in FIG. 18, the handle portion 16 is detached from the spoon portion 12. As described herein, a user may want to attach different spoon portions to the handle depending on the type malleable food product that is being served.

Figure 19:
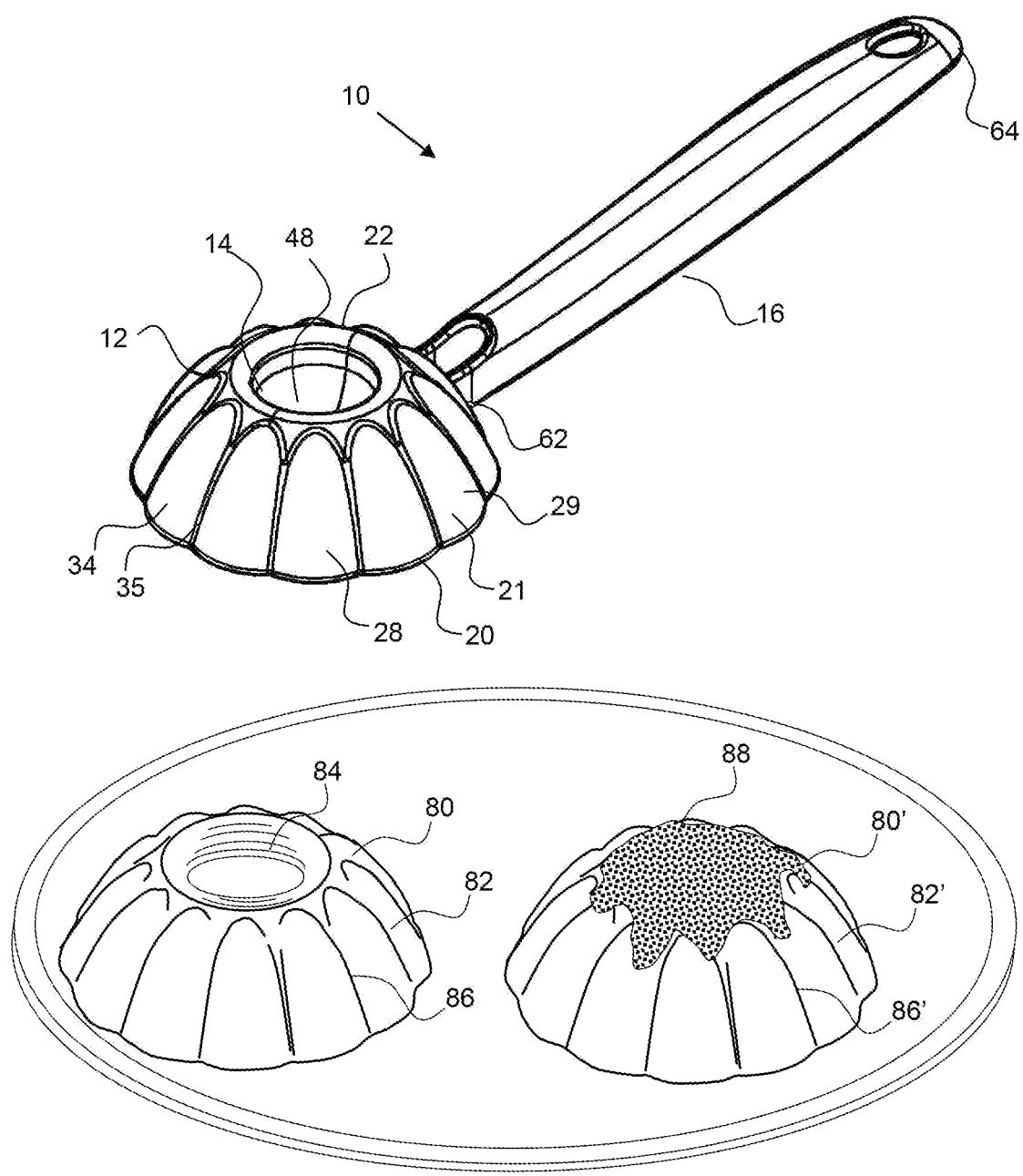
FIG. 19 shows an exemplary serving spoon that has served two servings of malleable food product, one having a fill food product in the depression formed by the serving spoon.

As shown in FIG. 19, an exemplary serving spoon 10 has served two servings of malleable food product 80, 80'. The depression 84 is shown in the first serving of malleable food product 80 and a fill food product 88 is configured within the depression of the second serving of malleable food product 80'. The depression food product is running down over the outer surface of the serving of malleable food product and is within the formed depression. A plurality of ridges 86 are formed in the outer surface of the servings of malleable food product to provide a decorative appearance.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A serving spoon comprising:
   a) a spoon portion comprising:
      i) a top having a top edge;
      ii) a bottom;
      iii) a front surface;
      iv) a back surface;
      v) a height from the bottom to the top;
      vi) a concave body defining a volume for retaining a food product;
      vii) a depression portion configured within the volume of the concave body and extending up toward said top;
      viii) a vent hole:
   b) a handle portion comprising:
      i) an attached end that is attached to the spoon portion;
      ii) an extended end;
      iii) a length from the attached end to the extended end;
      whereby in use, the depression portion of the serving spoon creates a depression in a malleable food product when the malleable food product is served with said serving spoon; and
      wherein the depression portion is a dome shaped depression portion and wherein the vent hole is configured at an apex of the depression portion.

2. The serving spoon of claim 1, wherein the concave body of the spoon portion has a substantially circular cross-sectional shape.

3. The serving spoon of claim 2, wherein the spoon portion has a top edge that is substantially circular in shape having a top edge diameter.

4. The serving spoon of claim 3, wherein the depression portion is substantially dome shaped having a depression portion diameter.

5. The serving spoon of claim 4, wherein the depression portion diameter is no more than 75% of the top edge diameter.

6. The serving spoon of claim 5, wherein the depression portion has a height and the spoon portion has a height, and wherein the height of the depression portion is at least 25% the height of the spoon portion.

7. The serving spoon of claim 1, wherein the handle extends from the spoon portion at a handle angle that is at least 15 degrees.

8. The serving spoon of claim 1, comprising at least four vent holes in the depression portion.

9. The serving spoon of claim 1, wherein the serving spoon consists of the spoon portion and the handle and is a single piece material.

10. The serving spoon of claim 9, wherein the serving spoon is an injection molded plastic.

11. The serving spoon of claim 1, wherein the concave body comprises a plurality of scallops.

12. The serving spoon of claim 1, wherein the depression portion is irregular shaped.

13. The serving spoon of claim 1, wherein the spoon portion is detachably attachable to the handle portion.

14. A method of serving a malleable food product and fill product comprising the steps of:
   a) providing the serving spoon of claim 1;
   b) providing a malleable food product;
   c) providing a fill food product;
   d) substantially filling the volume of the concave body with said malleable food product,
   e) serving the malleable food product from the serving spoon by turning the serving spoon upside down, with a portion of the top edge of the spoon portion contacting a serving location, and removing the serving spoon to produce a served portion of malleable food product;
      wherein a depression is formed by the depression portion in the served portion of malleable food product; and
   f) depositing said fill food product in the depression formed in the malleable food product.

15. The method of serving a malleable food product and fill product of claim 14, d;
   wherein the depression portion has a height that is at least one quarter the spoon portion height; and
   wherein the handle extends from the spoon portion at a handle angle that is at least 15 degrees.

* * * * *